(12) United States Patent
Ho

(10) Patent No.: US 8,070,307 B2
(45) Date of Patent: Dec. 6, 2011

(54) LIGHT-EMITTING WARNING DEVICE OF A SAFETY HELMET

(76) Inventor: Chang-Hsien Ho, Taoyuan County (TW)

( * ) Notice: Subject to any disclaimer, the term of this patent is extended or adjusted under 35 U.S.C. 154(b) by 351 days.

(21) Appl. No.: 12/318,884

(22) Filed: Jan. 12, 2009

(65) Prior Publication Data

US 2010/0177505 A1     Jul. 15, 2010

(51) Int. Cl.
*F21V 21/084* (2006.01)
(52) U.S. Cl. .......................................... 362/106; 362/570
(58) Field of Classification Search .................. 362/570, 362/473, 106, 184, 249.12
See application file for complete search history.

(56) References Cited

U.S. PATENT DOCUMENTS

| | | | | | |
|---|---|---|---|---|---|
| 5,559,680 | A | * | 9/1996 | Tabanera | 362/106 |
| 5,570,946 | A | * | 11/1996 | Chien | 362/106 |
| 5,931,559 | A | * | 8/1999 | Pfaeffle | 362/106 |
| 6,007,213 | A | * | 12/1999 | Baumgartner | 362/106 |
| 6,113,244 | A | * | 9/2000 | Baumgartner | 362/106 |
| 2002/0159250 | A1 | * | 10/2002 | Kuo et al. | 362/106 |
| 2009/0034238 | A1 | * | 2/2009 | Hurwitz | 362/106 |
| 2010/0128468 | A1 | * | 5/2010 | Ong et al. | 362/106 |

* cited by examiner

*Primary Examiner* — David V Bruce
(74) *Attorney, Agent, or Firm* — Bacon & Thomas, PLLC

(57) ABSTRACT

A light-emitting warning device of a safety helmet, including a helmet main body, a light guide element and a light source control mechanism. An annular locating groove and a receiving cavity are formed on an outer face of the helmet main body. Two end sections of the locating groove communicate with the receiving cavity via two through holes formed in the helmet main body. An elongated flexible strip body is received in the locating groove. Two end sections of the light guide element extend through the through holes into the receiving cavity to connect with the light source control mechanism. The light source control mechanism projects light into the light guide element, and emits as a lighting ring along the periphery of the helmet main body. The light guide element communicates with an interior of the helmet main body to avoid dropping.

30 Claims, 11 Drawing Sheets

LIGHT-EMITTING WARNING DEVICE OF A SAFETY HELMET

BACKGROUND OF THE INVENTION

The present invention is related to a light-emitting warning device of a safety helmet. The light-emitting warning device is firmly installed and located on an outer face of the safety helmet to emit light at high efficiency within a wide range so as to provide enhanced lighting warning effect.

FIG. 1 shows a conventional safety helmet with a warning strip 5 disposed along a circumference of the safety helmet. The warning strip 5 includes a flexible transparent strip body 50 and multiple warning lights (or LEDs) 51 uniformly distributed in the strip body 50. The warning lights 51 are controlled by a control circuit to light and flicker around the safety helmet so as to provide warning effect in the dark. Such warning strip 5 is manufactured at high cost and used with high power consumption. Therefore, it is necessary to frequently replace the cells. Moreover, the warning strip 5 has a considerable weight so that a user of the safety helmet will bear greater load. Therefore, it is inconvenient and not economical to use such safety helmet. In addition, the warning lights 51 emit light simply in specific directions. In the case that the number of the warning lights 51 is too small, the lighting range will be insufficient or unapparent. Therefore, the safety helmet must be equipped with a considerably large number of such warning lights to achieve apparent lighting effect. As a result, it is necessary to remove a considerable part of the safety helmet main body for providing a space in which the warning lights can be installed. Under such circumstance, the structural strength of the helmet will be deteriorated to affect the safety effect provided by the helmet.

FIG. 2 shows another conventional safety helmet having an inner shell 6. The inner shell 6 is formed with an annular groove 61 in which a light guide strip 62 and LEDs 63 are disposed. An upper shell 64 and a lower shell 65 are fitted on outer face of the inner shell 6. The rims of the upper and lower shells 64, 65 are inlaid in the groove 61 to fix the light guide strip 62. The inner shell is further formed with a cavity 66 in which a cell assembly 67 is received. In addition, a control circuit unit 68 with a switch is fixed between the inner shell 6 and the lower shell 65 for driving the LEDs 63 to emit light. The light guide strip 62 serves to guide the light throughout the periphery of the safety helmet. Such structure is able to lower power consumption. However, the wall of the annular groove 61 in which the light guide strip 62 is inlaid can hardly reflect the light. Moreover, the rims of the upper and lower shells 64, 65 serve to hold the light guide strip 62 in the annular groove 61. It is quite difficult to assemble the light guide strip 62 with the helmet in this manner so that the manufacturing cost of the helmet is increased and the competitive ability of the product is affected. In addition, it often takes place that the light guide strip 62 is not truly held in the annular groove 61. As a result, in use, the light guide strip 62 is likely to drop out of the groove 61 and damage or even hit a rider's face or tangle with the rider's neck. This is extremely dangerous. In order to solve this problem, the open side of the channel 61 is generally formed with a width smaller than the diameter of the light guide strip 62, whereby the light guide strip 62 can be inlaid in the annular groove 61 without dropping out. However, such measure will inevitably reduce the area of the light guide strip 62 exposed to outer side. As a result, the intensity and scattering area of the light emitted from the light guide strip 62 will be seriously affected. Also, the light guide strip 62 is totally positioned on outer circumference of the inner shell with the connection sections of the control circuit unit exposed to outer side. Consequently, external water and dust tend to infiltrate into the control circuit unit to wet the light guide strip 62. This will affect the light diffusion effect of the light guide strip 62.

U.S. Pat. No. 6,007,213 discloses a safety helmet including an inner shell formed with a recessed channel. A fiber optic cable is received in the recessed channel. Two end sections of the fiber optic cable are connected to a light source via two connectors respectively. The light source is connected to a power source via a switch. The inner shell is covered by an outer shell. The outer shell is formed with a transparent area corresponding to the extending position of the fiber optic cable. The light generated by the light source is guided by the fiber optic cable and emitted outward through the transparent area of the outer shell. In such structure, the fiber optic cable and relevant components are protected by the outer shell. Therefore, the safety helmet has higher reliability and longer using life. However, the recessed channel is positioned on the inner shell, while the transparent area is formed on the outer shell. Therefore, in practical development and production, the inner and outer shells must be manufactured with high precision. Otherwise, after assembled, the recessed channel may be misaligned from the transparent area. In this case, the light emitted from the fiber optic cable will be interrupted by those areas other than the transparent area. Accordingly, both the poor transparence and the error in the assembling process will affect the light diffusion effect of the fiber optic cable. As a result, the ratio of defective products will increase due to difficulty in processing. This will lead to increment of manufacturing cost.

SUMMARY OF THE INVENTION

It is therefore a primary object of the present invention to provide a light-emitting warning device of a safety helmet, in which a point light source is used to achieve lighting effect within a large range so as to provide more apparent warning effect.

It is a further object of the present invention to provide the above light-emitting warning device of the safety helmet, which is able to emit light at high efficiency with lower power consumption. Therefore, the using cost is reduced.

It is still a further object of the present invention to provide the above light-emitting warning device of the safety helmet, in which the connection sections of the respective components and light guide element are positioned in the outer shell of the helmet main body and protected from water and dust. Therefore, the light guide element is firmly assembled with the helmet main body and the using life of the product is prolonged.

It is still a further object of the present invention to provide the above light-emitting warning device of the safety helmet, in which the light guide element is more sufficiently exposed to outer side of the helmet main body so that the light diffusion area is enlarged.

According to the above objects, the light-emitting warning device of the safety helmet of the present invention includes a helmet main body, a light guide element and a light source control mechanism. An annular locating groove and a receiving cavity are formed on an outer face of the helmet main body. Two end sections of the locating groove communicate with the receiving cavity via two through holes formed in the helmet main body. The light guide element is an elongated flexible strip body, which is received in the locating groove. Two end sections of the light guide element extend through the through holes into the receiving cavity to connect with the light source control mechanism. The light source control mechanism has at least one light source body and an internal cell room for accommodating a cell therein. The light source control mechanism further has at least one control switch for varying the state of electric connection between the light source body and the cell. When the light source body is turned on, the light source body projects light into the end sections of the light guide element.

Two hub sections are respectively formed on two sides of the light source control mechanism. The hub sections are fitted in the through holes of the helmet main body to connect with two ends of the light guide element.

An outer end of each hub section is formed with a light projection hole. Two ends of the light guide element are inserted and connected in the light projection holes. Two light source bodies are respectively disposed beside inner ends of the hub sections.

The present invention can be best understood through the following description and accompanying drawings wherein:

BRIEF DESCRIPTION OF THE DRAWINGS

FIG. 10A is an enlarged view of circled area 10A of FIG. 10.

DETAILED DESCRIPTION OF THE PREFERRED EMBODIMENTS

Figure 1:
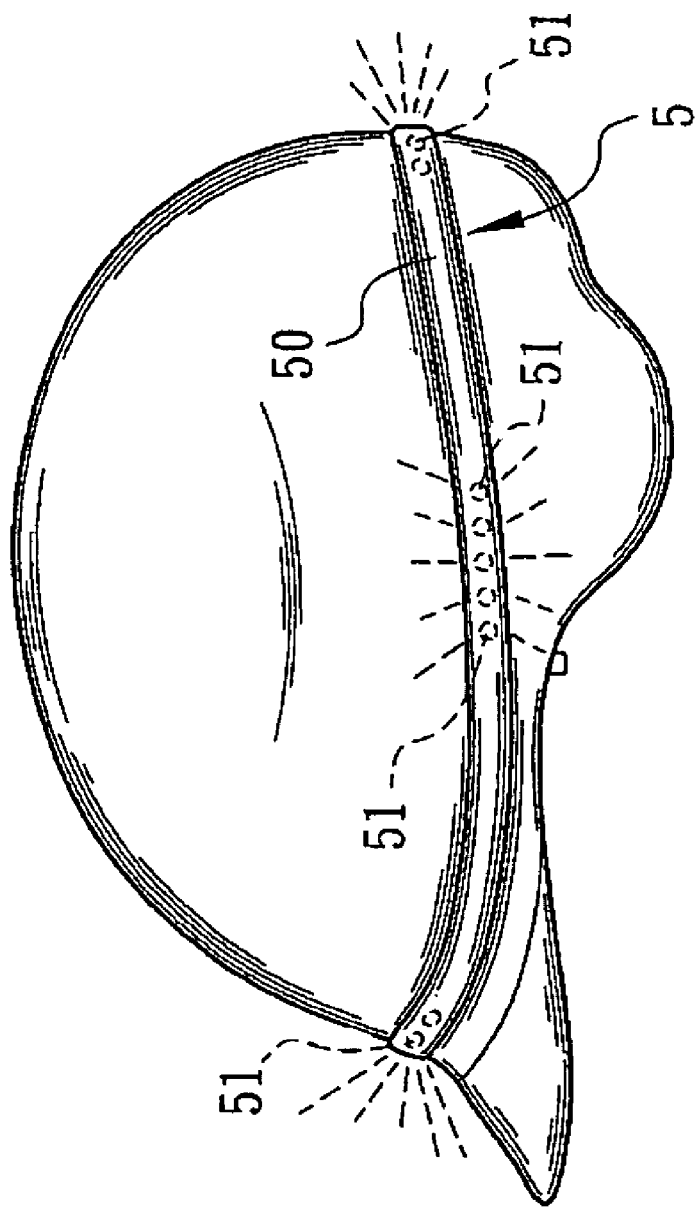
FIG. 1 shows a conventional safety helmet with a light-emitting warning device.
Figure 2:
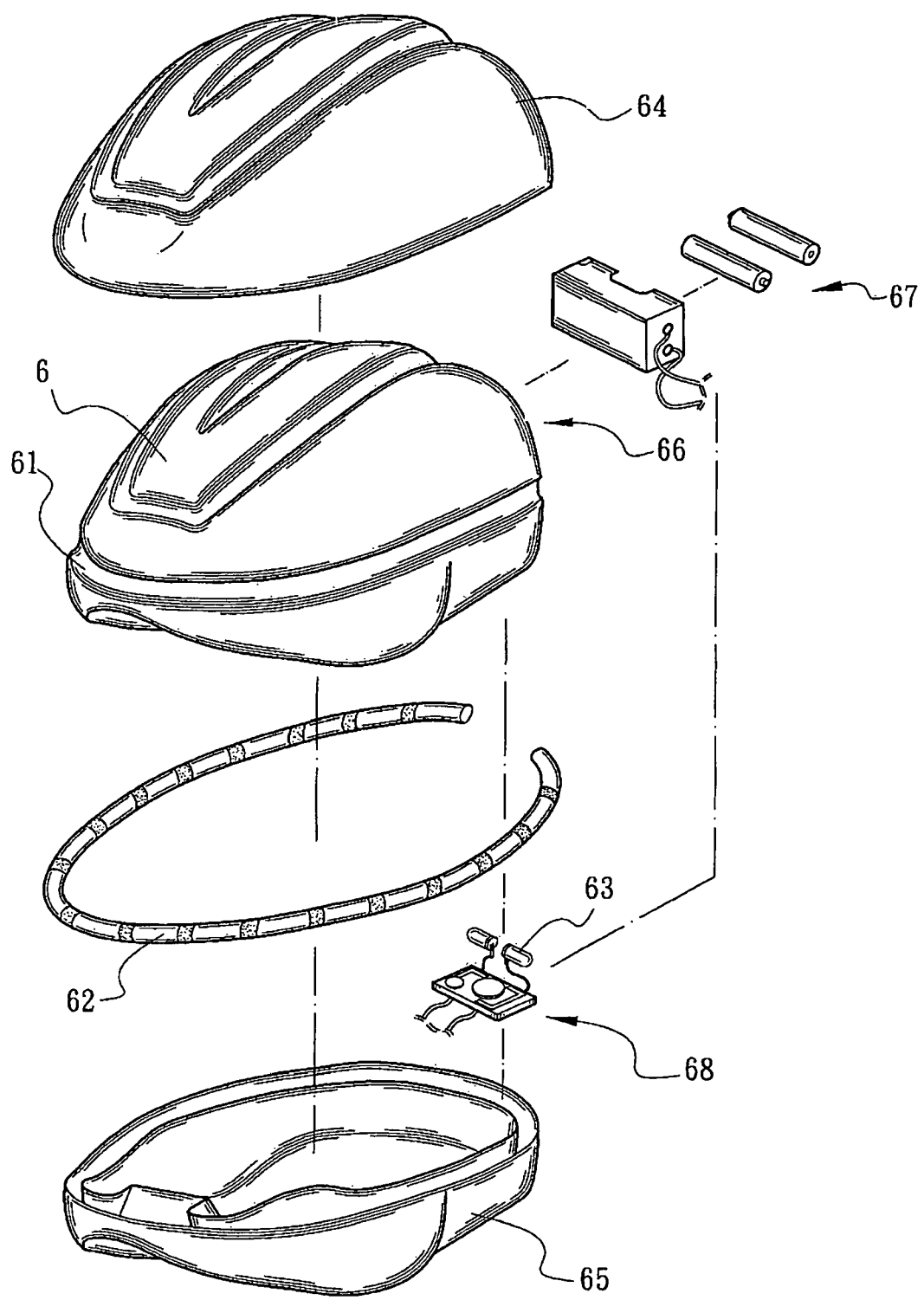
FIG. 2 shows another conventional safety helmet with a light-emitting warning device.
Figure 3:
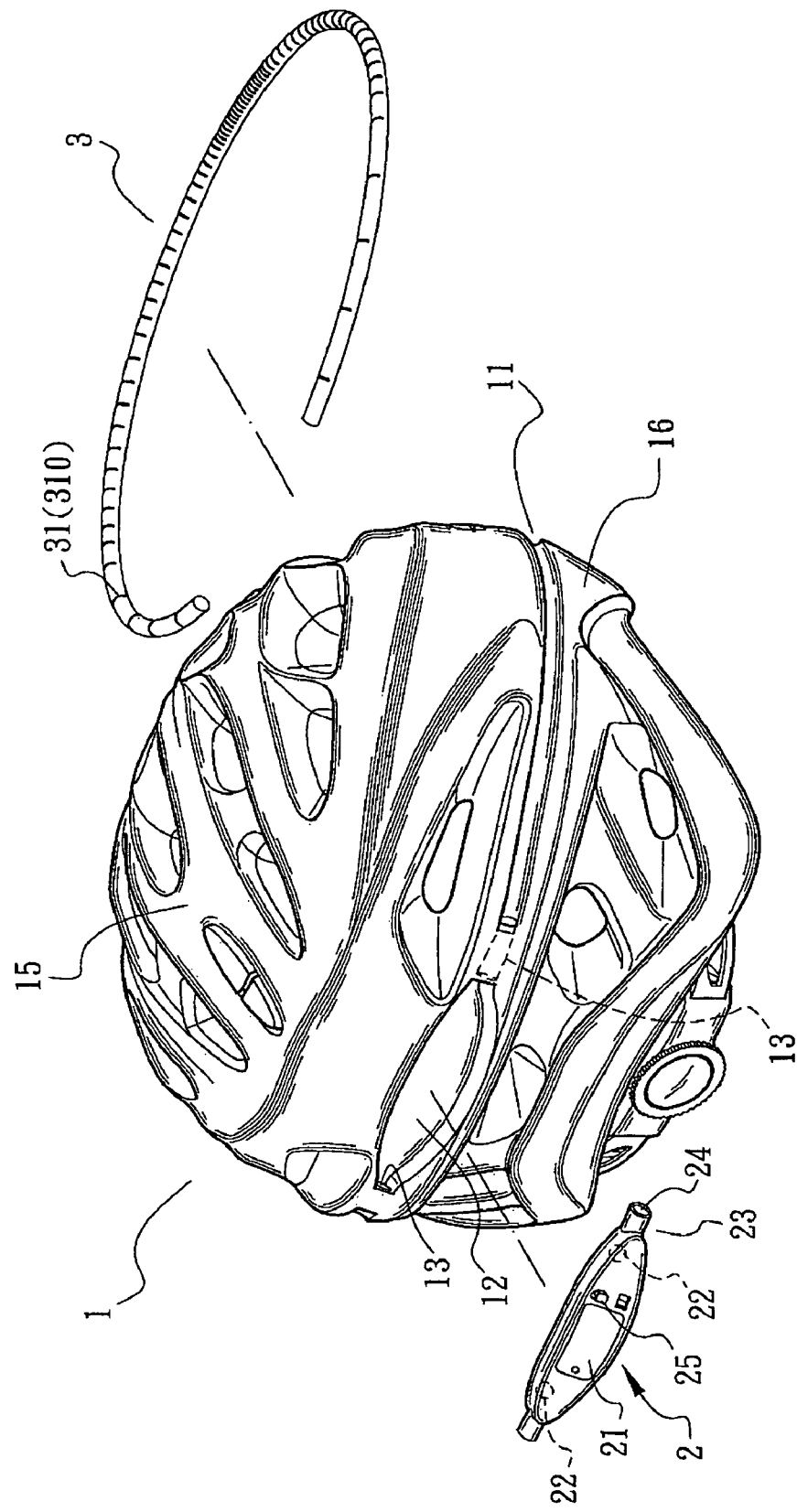
FIG. 3 is a perspective exploded view of a first embodiment of the present invention.
Figure 5:
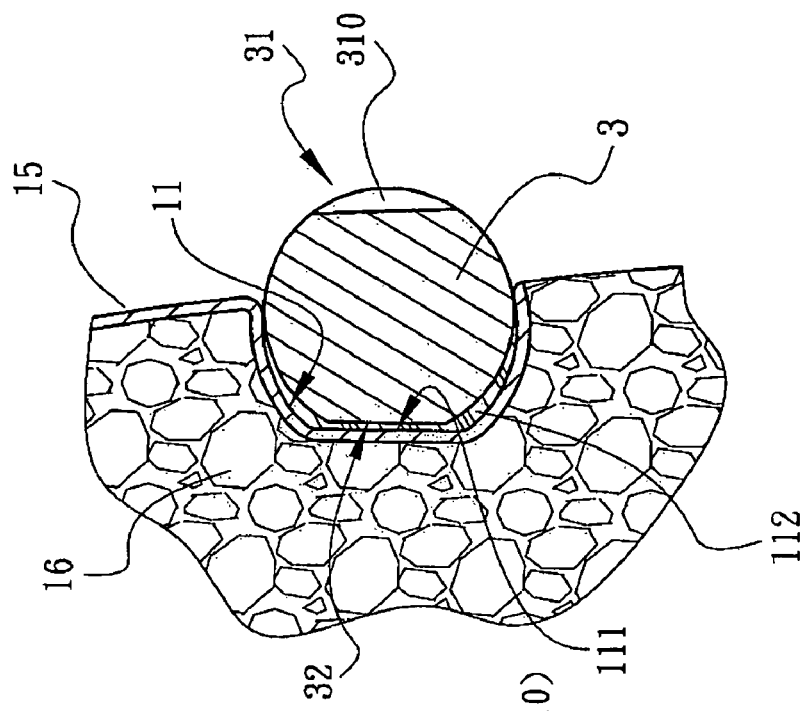
FIG. 5 is a sectional view showing that the light guide element is inlaid in the locating groove of the helmet main body of the present invention.
Figure 4:
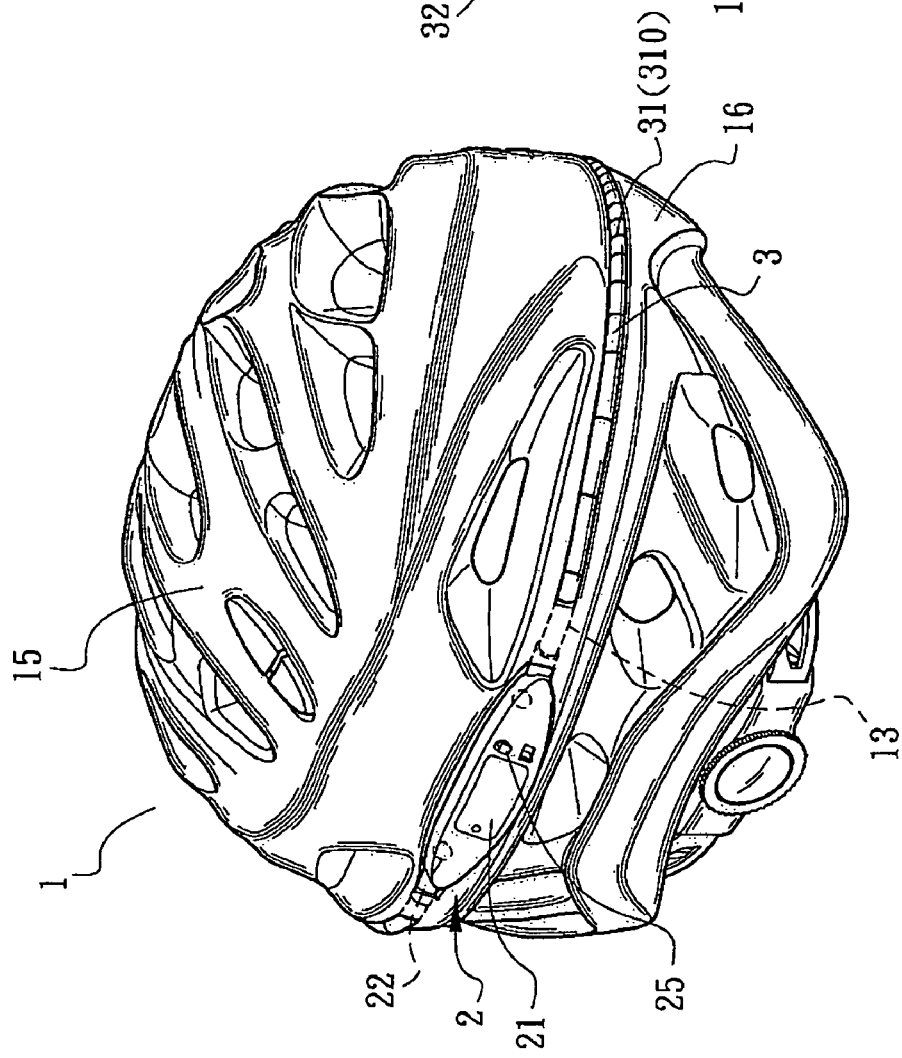
FIG. 4 is a perspective assembled view of the first embodiment of the present invention.
Figure 6:
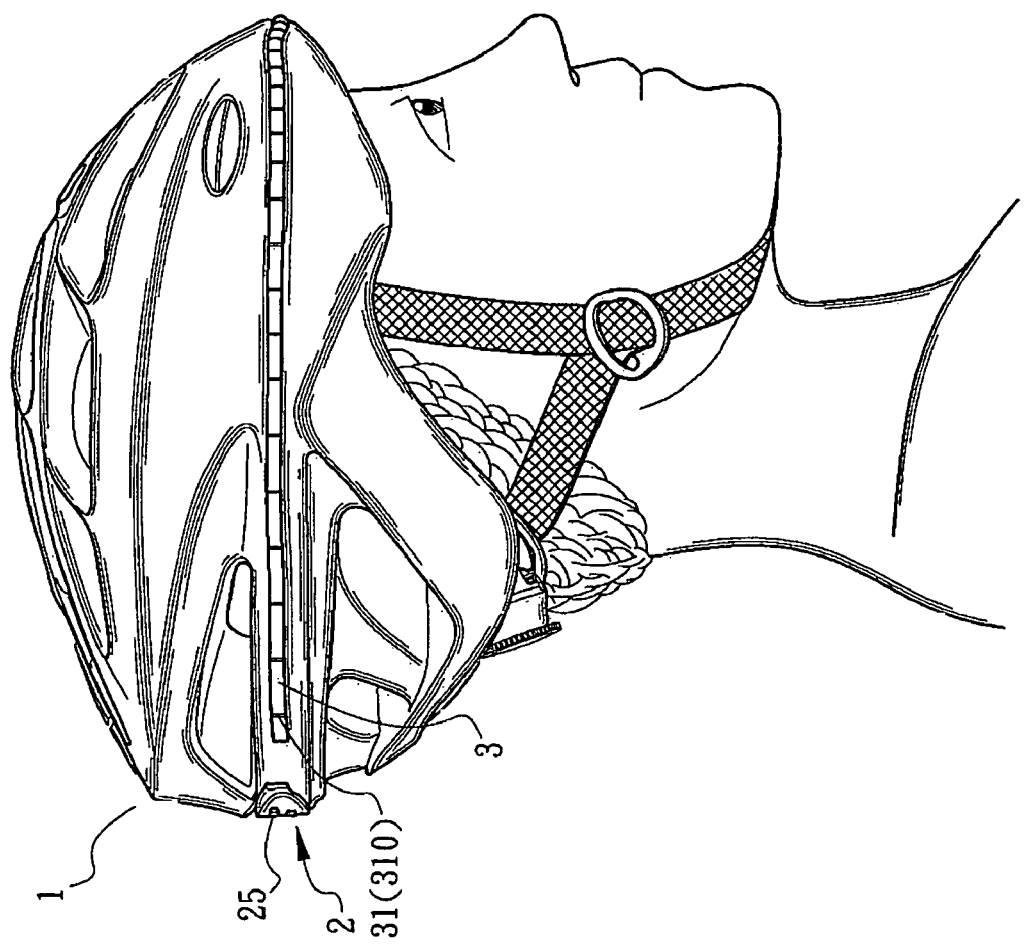
FIG. 6 shows an application of the present invention.

Please refer to FIGS. 3 to 6. The light-emitting warning device of the safety helmet of the present invention includes a helmet main body 1, a light source control mechanism 2 and a light guide element 3. The helmet main body 1 is composed of an outer shell 15 and a foam body 16 formed in the outer shell 15. An annular locating groove 11 is formed on an outer face of the outer shell 15. In addition, a receiving cavity 12 is formed on the helmet main body 1. At least one through hole 13 is formed on the locating groove 11 in communication with an interior of the outer shell 15 or the helmet main body 1. Each of two ends of the locating groove 11 communicates with the receiving cavity 12 via at least one through hole 13 formed in the helmet main body 1. A bottom wall of the locating groove 11 is formed with a plane face 111, which is painted with an adhesive light reflection layer 112. The light source control mechanism 2 is disposed in the receiving cavity 12. The light source control mechanism 2 has an internal cell room 21 in which power supplies, that is, cells, can be accommodated. Two hub sections 23 are respectively formed on two sides of the light source control mechanism 2. The hub sections 23 are fitted in the through holes 13 of the helmet main body 1 to locate the light source control mechanism 2. A light source body 22 is disposed beside an inner end of each hub section 23. An outer end of the hub section 23 is formed with a light projection hole 24. At least one control switch 25 is disposed between the cell room 21 and the light source bodies 22. By means of the control switch 25, the state of electric connection between the light source bodies 22 and the cells can be varied to control the lighting pattern of the light source bodies 22. The light emitted by the light source bodies 22 is projected outward through the light projection holes 24. The light guide element 3 is an elongated flexible strip body with light guiding property. Multiple light reflection sections 31 are formed and arranged on an outer side of the light guide element 3. The light reflection sections 31 can have the form of facial recessed/raised stripes 310 as shown in FIG. 3. (The recessed/raised stripes can be cuts or any other facial or internal structure with light refraction/reflection effect.) An inner side of the light guide element 3 is formed with a plane face 32 corresponding to the plane face 111. Accordingly, it is easier to install the light guide element 3 into the locating groove 11 in true direction. The light reflection sections 31 are arranged on the light guide element 3 equally or in a manner that the light reflection sections 31 gradually become denser and denser from two end sections of the light guide element 3 to a middle section thereof. The light guide element 3 is received in the locating groove 11. Two ends of the light guide element 3 extend into the through holes 13 respectively and are inserted and held in the light projection holes 24. In addition, the light guide element 3 is adhered to the plane face 111 by means of the adhesive light reflection layer 112. Accordingly, the light guide element 3 is firmly located in the locating groove 11 without detachment. Under such circumstance, even if the diameter of the light guide element 3 is smaller than or approximately equal to the width of the open side of the locating groove 11, it still can be ensured that the light guide element 3 is reliably installed in the locating groove 11. Accordingly, the light guide element 3 protrudes and exposes to outer side of the helmet main body 1 more sufficiently to achieve more apparent and better lighting warning effect within a wider range.

In use, by means of the control switch 25, the state of electric connection between the cells and the light source bodies 22 can be varied to control the lighting pattern of the light source bodies 22. The light emitted by the light source bodies 22 is projected through the light projection holes 24 into the light guide element 3. By means of the light guiding property of the light guide element 3 and light refraction/reflection effect of the light reflection sections 31 and the light reflection layer 112, the light guide element 3 will emit light as a lighting ring along the periphery of the helmet main body 1. Accordingly, the light guide element 3 can provide warning effect in a dim environment. On the other hand, the light reflection sections 31 gradually become denser and denser from two end sections of the light guide element 3 to the middle section thereof. This can compensate the decay of the guided light of those sections farther from the light source bodies 22. Therefore, the respective parts of the light guide element 3 can uniformly output light beams.

Figure 10:
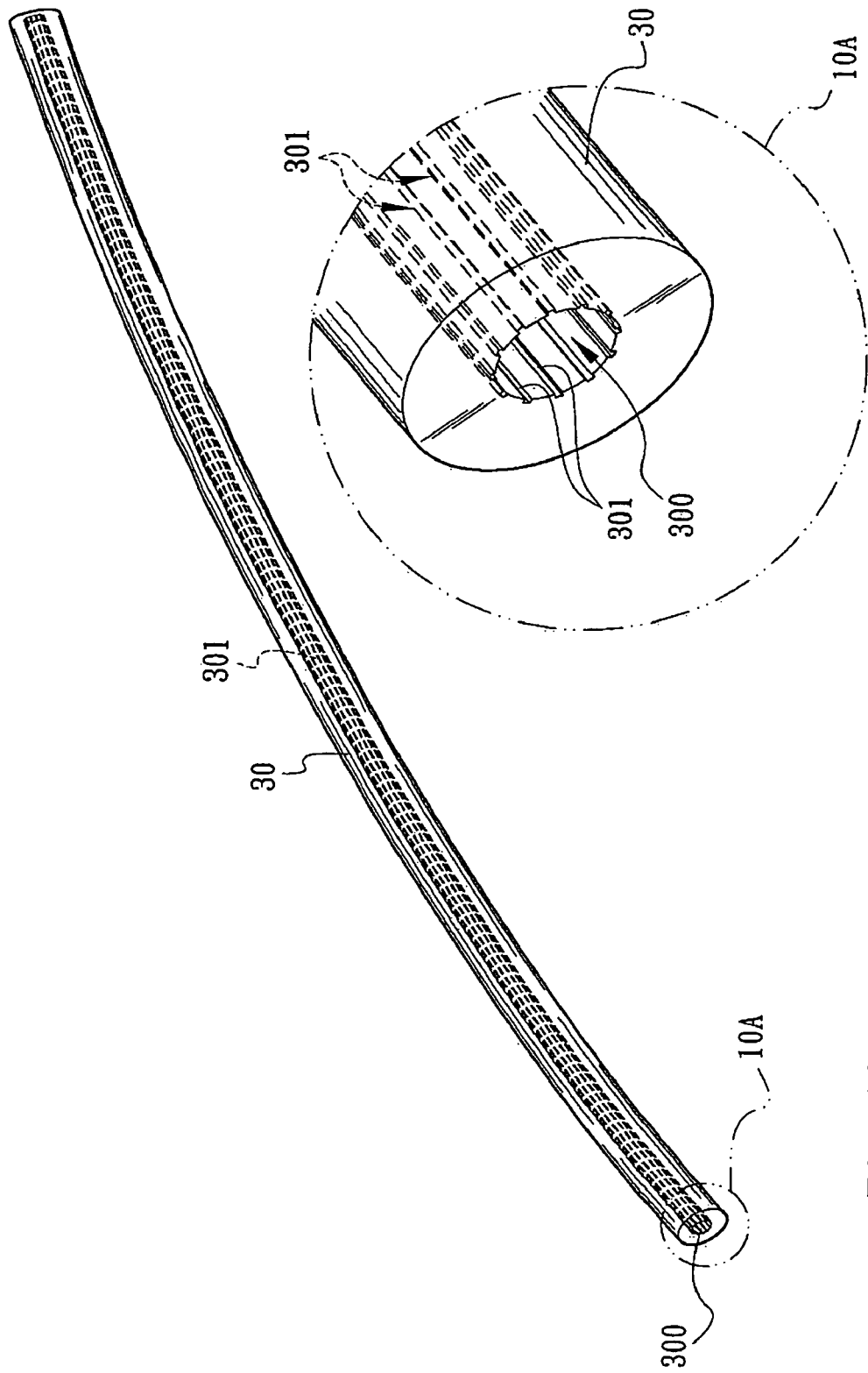
FIG. 10 is a perspective view of an embodiment of the light guide element of the present invention.
Figures 11, 11A:
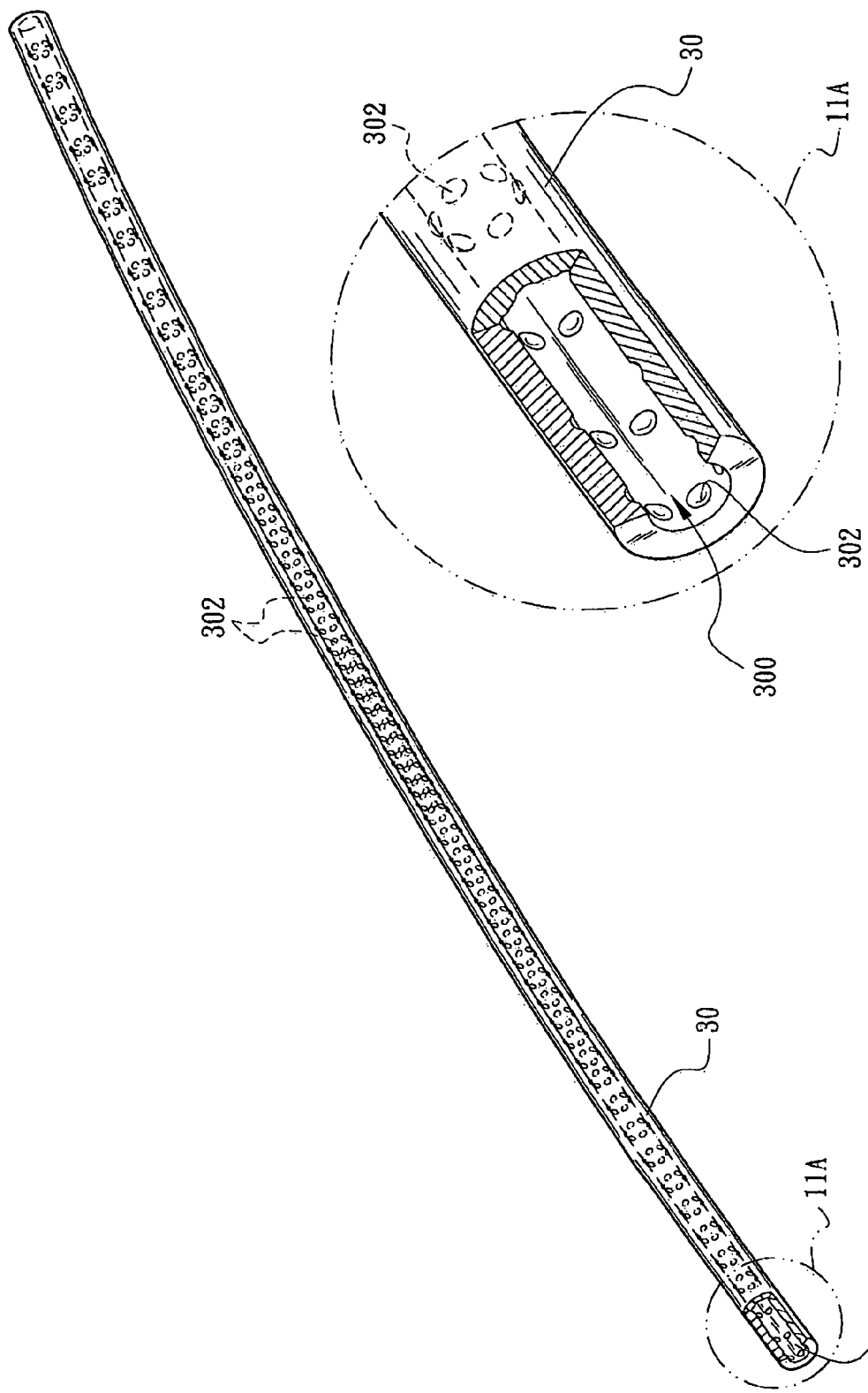
FIG. 11 is a perspective view of another embodiment of the light guide element of the present invention.
FIG. 11A is an enlarged view of circled area 11A of FIG. 11.
Figures 12, 12A:
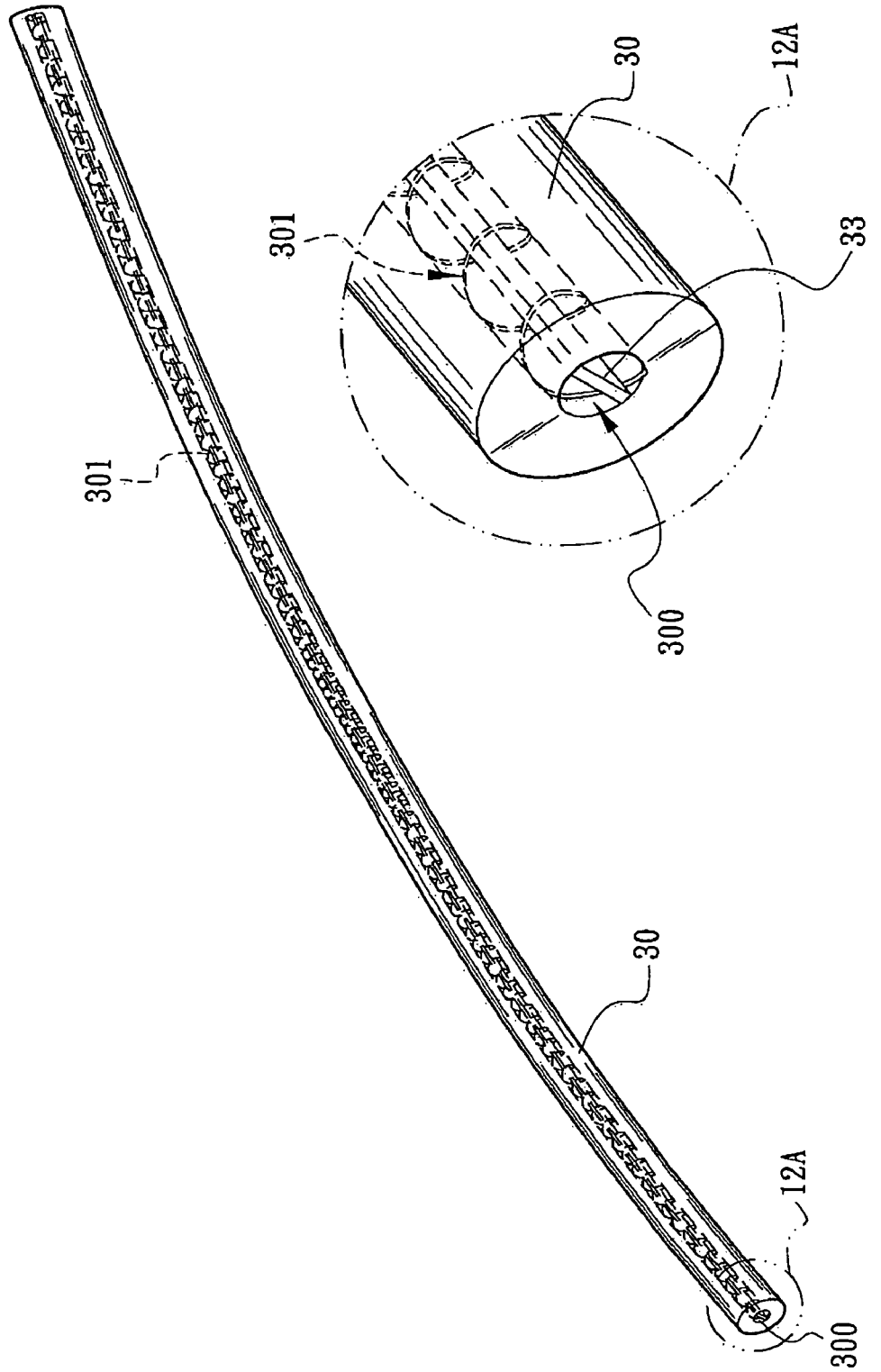
FIG. 12 is a perspective view of still another embodiment of the light guide element of the present invention.
FIG. 12A is an enlarged view of circled area 12A of FIG. 12.

In addition, for reducing the weight of the light guide element and increasing flexibility thereof, the light guide element can have the form of a transparent hollow tubular body 30 having an internal chamber 300. Multiple light reflection sections such as continuous light refraction/reflection recessed/raised marks 301 or discontinuous light refraction/reflection dots/notches 302 are formed on a wall of the internal chamber 300 (as shown in FIGS. 10 and 11). Accordingly, the light projected into the tubular body 30 from the end thereof can be continuously reflected and refracted by the light reflection sections to achieve apparent lighting effect. Moreover, the tubular body 30 serves to guide the light and reduce diffusion thereof to enhance brightness. FIGS. 12 and 12A show that a light reflection strip or color bar 33 is received in the internal chamber 300 of the tubular body 30 in addition to the recessed/raised light reflection sections 301, 302. The light reflection strip or color bar 33 serves to reflect external light or emit different colors of light.

In the above arrangement, the point light sources cooperate with the light guide element 3 to output light within a larger range. Accordingly, as a whole, the lighting efficiency is enhanced to provide more apparent warning effect. Also, the power consumption can be lowered to meet the requirements of energy saving and carbon reduction. Furthermore, the light guide element 3 is fixed in the locating groove 11 by means of adhesion and through holes. Also, the connection sections (hub sections 23) of the light source control mechanism 2 and the ends of the light guide element 3 are positioned in the through holes 13 and protected from water and dust. Therefore, the using life of the product is prolonged. In addition, the structure of the light-emitting warning device is simplified and the number of components thereof is reduced to lower manufacturing cost and promote competitive ability of the product.

Figure 7:
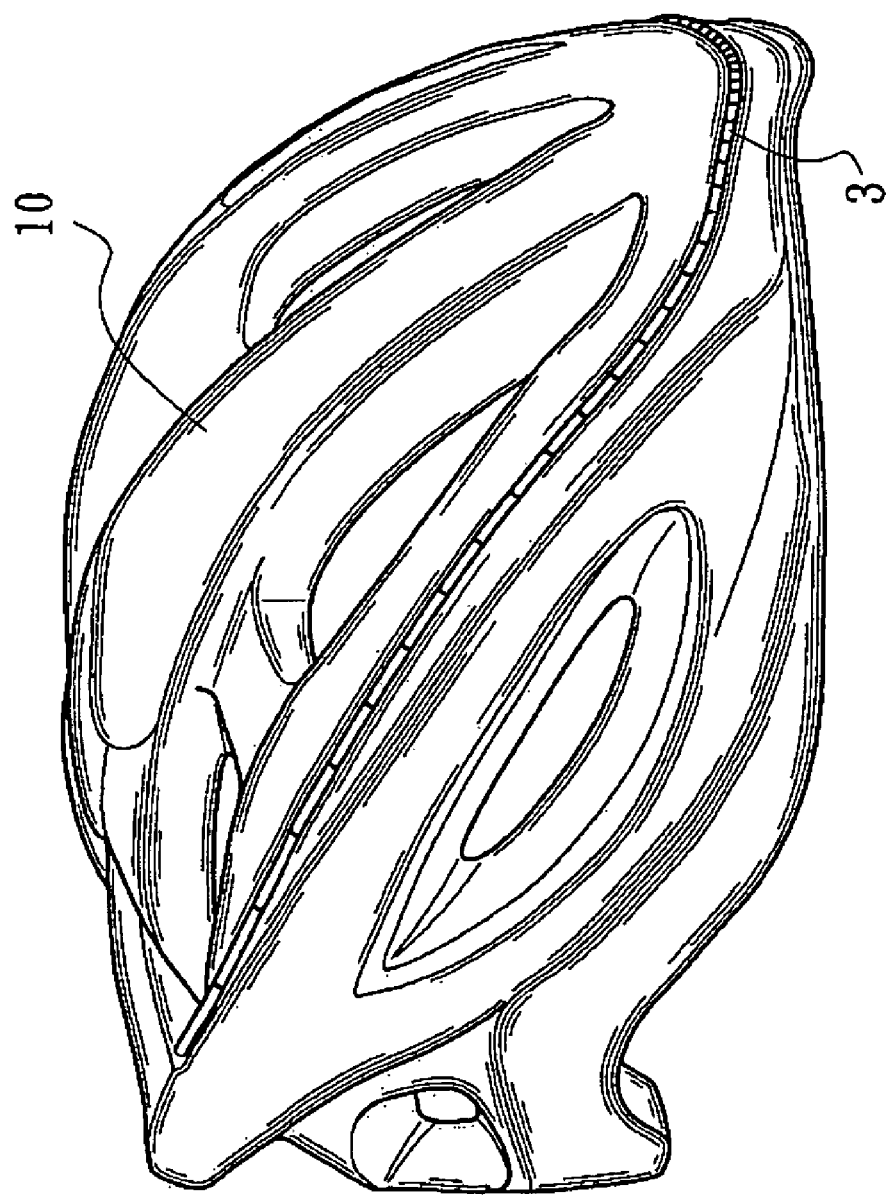
FIG. 7 is a front perspective view of a second embodiment of the present invention.
Figure 8:
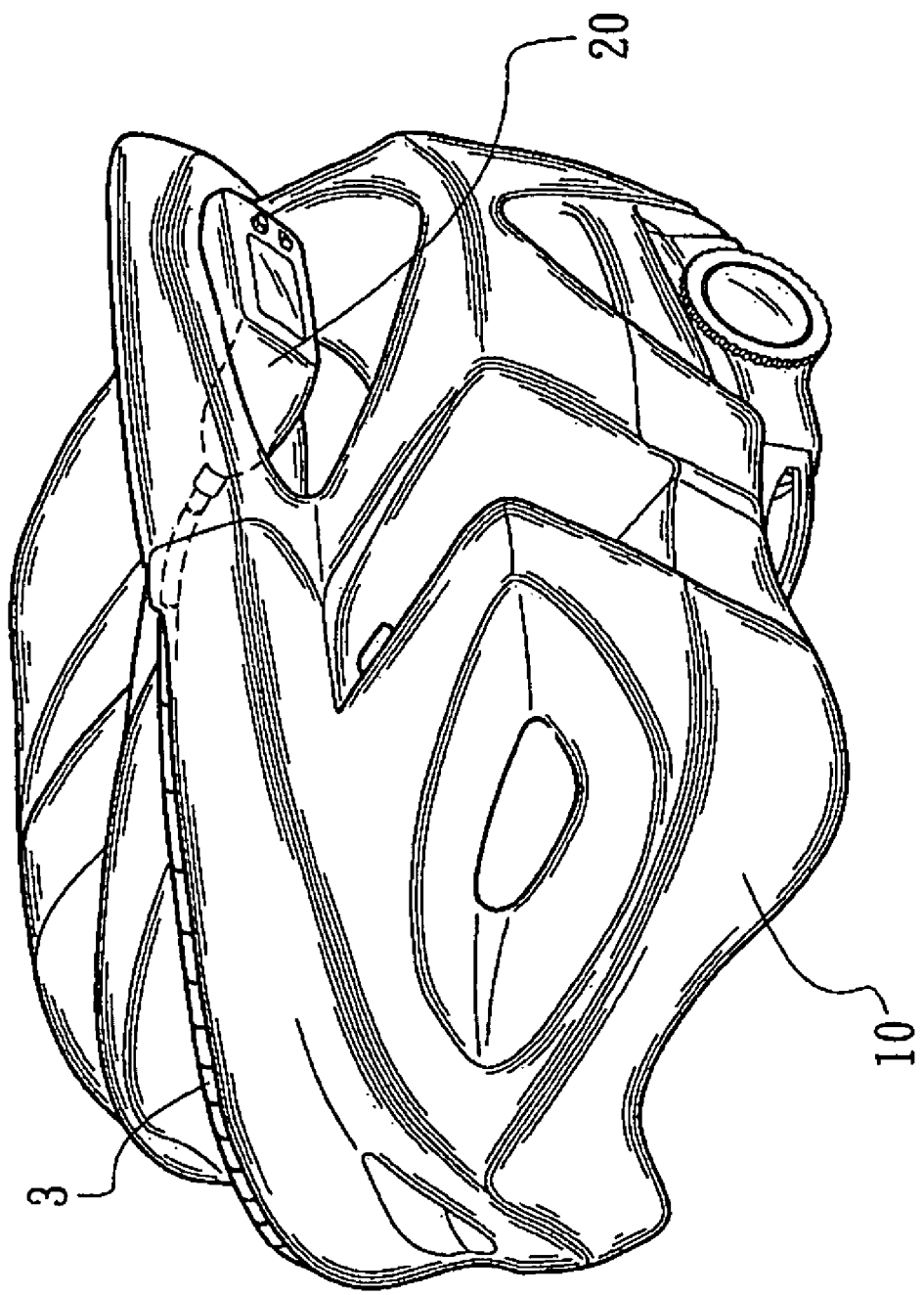
FIG. 8 is a rear perspective view of the second embodiment of the present invention.

As shown in FIGS. 7 and 8, in practice, in the case that the helmet main body 10 has a different configuration, the light guide element 3 can be still disposed on a middle-height section of outer face of the helmet main body 10 in the same manner rather than along the periphery of the open side of the helmet main body 10 (as shown in FIG. 3). The configuration of the light source control mechanism 20 can be varied in accordance with the shape of the helmet main body 10. Accordingly, the light-emitting warning device can be adapted to the pattern of the helmet main body 10 to achieve optimal light-emitting warning effect.

Figure 9:
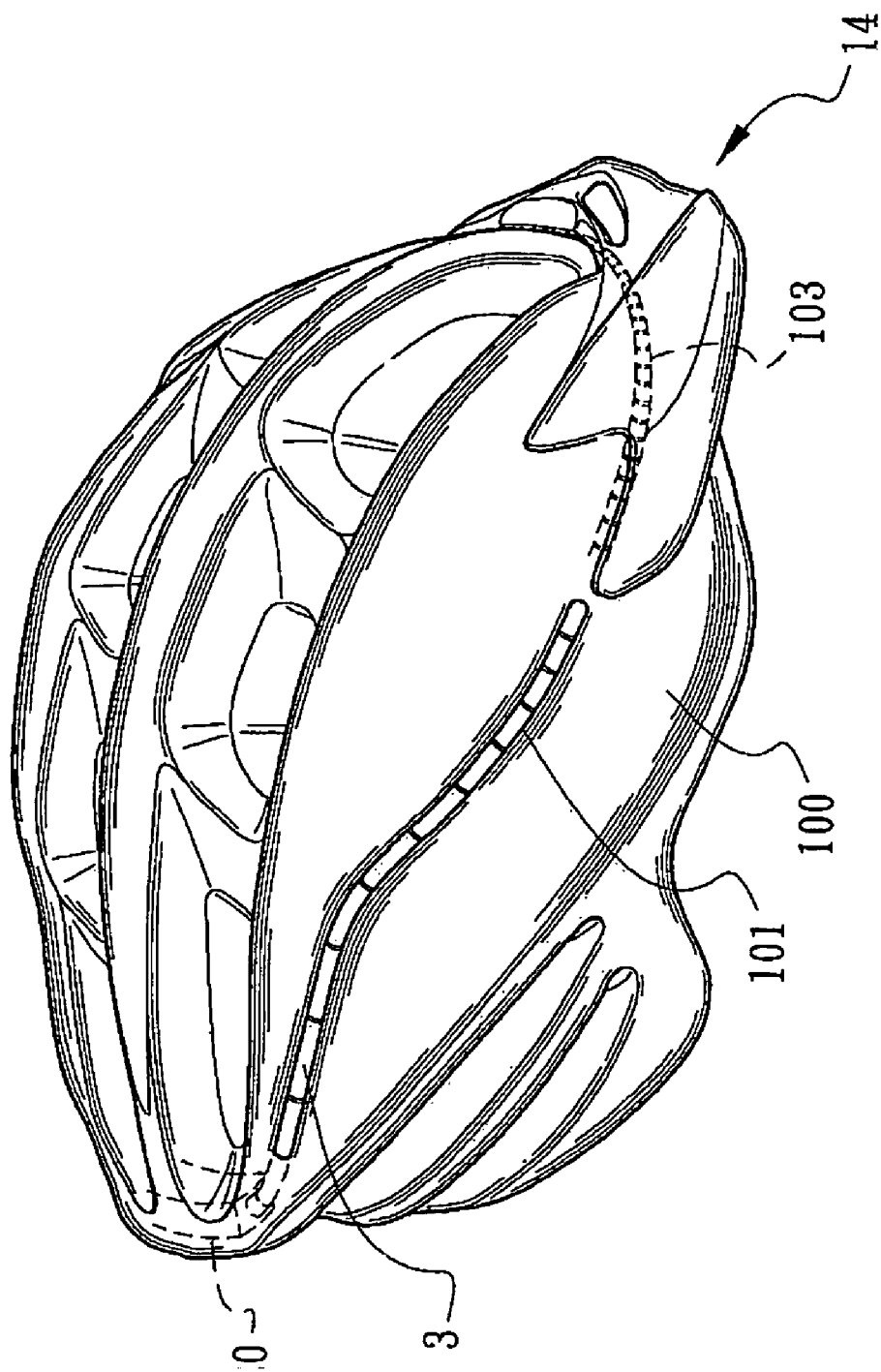
FIG. 9 is a perspective view of a third embodiment of the present invention.

FIG. 9 shows a helmet main body 100 having a brim 14. The helmet main body 100 has a basic structure similar to that of the aforesaid helmet main body 10. The brim 14 is positioned on an edge of the helmet main body 100 and may interrupt the path (the locating groove 101) of the light guide element 3. This will affect the assembling of the light guide element 3. Accordingly, a tunnel 103 is formed in the helmet main body 100 in a position where the brim 14 is disposed. Under such circumstance, the light guide element 3 can pass through the tunnel 103 to avoid the brim 14. In this case, the light guide element 3 is also more firmly assembled with the helmet main body 100.

The above embodiments are only used to illustrate the present invention, not intended to limit the scope thereof. Many modifications of the above embodiments can be made without departing from the spirit of the present invention.

What is claimed is:

1. A light-emitting warning device of a safety helmet, comprising:
a helmet main body, an annular locating groove and a receiving cavity being formed on an outer face of the helmet main body, the locating groove having two end sections in communication with or adjacent to the receiving cavity;
a light guide element, which is an elongated flexible strip body with light guiding property, the light guide element being received in the locating groove, two end sections of the light guide element extending into the receiving cavity, the light guide element being at least partially exposed to outer side of the locating groove; and
a light source control mechanism having at least one internal light source body and at least one control switch, by means of the control switch, a state of electric connection between the light source body and a power source being variable, whereby when the light source body is turned on, the light source body projects light into the end sections of the light guide element that extend into the receiving cavity,
wherein the receiving cavity communicates with the locating groove via at least one through hole formed in the helmet main body such that the through hole extends from the receiving cavity to the locating groove, and the through hole is formed in a middle section of the locating groove in communication with an interior of the helmet main body.

2. The light-emitting warning device of the safety helmet as claimed in claim 1, wherein two hub sections are respectively formed on two sides of the light source control mechanism, the hub sections being fitted in the through holes of the helmet main body, two ends of the light guide element being connected with the hub sections in the through holes.

3. The light-emitting warning device of the safety helmet as claimed in claim 2, wherein an outer end of each hub section is formed with a light projection hole, two ends of the light guide element being inserted and connected in the light projection holes, two light source bodies being respectively disposed beside inner ends of the hub sections.

4. The light-emitting warning device of the safety helmet as claimed in claim 1, wherein the light guide element is a hollow tubular body having an axial internal chamber, multiple light reflection sections being continuously or discontinuously formed on a wall of the internal chamber.

5. The light-emitting warning device of the safety helmet as claimed in claim 4, wherein a light reflection strip or color bar is received in the internal chamber of the light guide element.

6. The light-emitting warning device of the safety helmet as claimed in claim 4, wherein a through hole is formed on a middle section of the locating groove in communication with an interior of the helmet main body.

7. The light-emitting warning device of the safety helmet as claimed in claim 1, wherein the helmet main body is composed of an outer shell and a foam body directly formed in the outer shell, the locating groove being formed on a surface of the outer shell.

8. The light-emitting warning device of the safety helmet as claimed in claim 4, wherein the helmet main body is composed of an outer shell and a foam body directly formed in the outer shell, the locating groove being formed on a surface of the outer shell.

9. The light-emitting warning device of the safety helmet as claimed in claim 1, wherein a bottom wall of the locating groove is formed with a plane face.

10. The light-emitting warning device of the safety helmet as claimed in claim 9, wherein an inner side of the light guide element is formed with a plane face corresponding to the plane face of the locating groove.

11. The light-emitting warning device of the safety helmet as claimed in claim 4, wherein a bottom wall of the locating groove is formed with a plane face.

12. The light-emitting warning device of the safety helmet as claimed in claim 11, wherein an inner side of the light guide element is formed with a plane face corresponding to the plane face of the locating groove.

13. The light-emitting warning device of the safety helmet as claimed in claim 1, wherein a light reflection layer is painted in the locating groove.

14. The light-emitting warning device of the safety helmet as claimed in claim 13, wherein the light reflection layer is adhesive for fixedly adhering the light guide element in the locating groove.

15. The light-emitting warning device of the safety helmet as claimed in claim 4, wherein a light reflection layer is painted in the locating groove.

16. The light-emitting warning device of the safety helmet as claimed in claim 7, wherein a light reflection layer is painted in the locating groove.

17. The light-emitting warning device of the safety helmet as claimed in claim 9, wherein a light reflection layer is painted in the locating groove.

18. The light-emitting warning device of the safety helmet as claimed in claim 1, wherein multiple light reflection sections are formed on the light guide element for outward refracting the light passing through the light guide element to achieve light diffusion effect.

19. The light-emitting warning device of the safety helmet as claimed in claim 4, wherein multiple light reflection sections are formed on the light guide element for outward refracting the light passing through the light guide element to achieve light diffusion effect.

20. The light-emitting warning device of the safety helmet as claimed in claim 7, wherein multiple light reflection sections are formed on the light guide element for outward refracting the light passing through the light guide element to achieve light diffusion effect.

21. The light-emitting warning device of the safety helmet as claimed in claim 9, wherein multiple light reflection sections are formed on the light guide element for outward refracting the light passing through the light guide element to achieve light diffusion effect.

22. The light-emitting warning device of the safety helmet as claimed in claim 13, wherein multiple light reflection sections are formed on the light guide element for outward refracting the light passing through the light guide element to achieve light diffusion effect.

23. The light-emitting warning device of the safety helmet as claimed in claim 18, wherein the light reflection sections are arranged on the light guide element in such a manner that the light reflection sections gradually become denser and denser from two end sections of the light guide element to a middle section thereof.

24. The light-emitting warning device of the safety helmet as claimed in claim 18, wherein the light reflection sections are cuts.

25. The light-emitting warning device of the safety helmet as claimed in claim 1, wherein the power supply is a cell and the light source control mechanism has an internal cell room in which the cell is accommodated.

26. The light-emitting warning device of the safety helmet as claimed in claim 4, wherein the power supply is a cell and the light source control mechanism has an internal cell room in which the cell is accommodated.

27. The light-emitting warning device of the safety helmet as claimed in claim 7, wherein the power supply is a cell and the light source control mechanism has an internal cell room in which the cell is accommodated.

28. The light-emitting warning device of the safety helmet as claimed in claim 9, wherein the power supply is a cell and the light source control mechanism has an internal cell room in which the cell is accommodated.

29. The light-emitting warning device of the safety helmet as claimed in claim 13, wherein the power supply is a cell and the light source control mechanism has an internal cell room in which the cell is accommodated.

30. The light-emitting warning device of the safety helmet as claimed in claim 18, wherein the power supply is a cell and the light source control mechanism has an internal cell room in which the cell is accommodated.

* * * * *